United States Patent
Park

(10) Patent No.: US 7,889,444 B2
(45) Date of Patent: Feb. 15, 2011

(54) LENS OPTICAL SYSTEM

(75) Inventor: Young-woo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 12/488,788

(22) Filed: Jun. 22, 2009

(65) Prior Publication Data
US 2009/0323205 A1 Dec. 31, 2009

(30) Foreign Application Priority Data
Jun. 26, 2008 (KR) .................. 10-2008-0061118

(51) Int. Cl.
*G02B 9/12* (2006.01)
*G02B 9/04* (2006.01)
(52) U.S. Cl. ................. 359/784; 359/793
(58) Field of Classification Search ........... 359/753, 359/784, 793
See application file for complete search history.

(56) References Cited

U.S. PATENT DOCUMENTS 5,477,388 A * 12/1995 Ishiyama et al. ........... 359/749

FOREIGN PATENT DOCUMENTS

| JP | 05-188294 A | 7/1993 |
| JP | 09-033801 A | 2/1997 |
| JP | 11-030743 A | 2/1999 |
| JP | 2001-330771 A | 11/2001 |

* cited by examiner

*Primary Examiner*—William C Choi
(74) *Attorney, Agent, or Firm*—Drinker Biddle & Reath LLP

(57) ABSTRACT

A wide-angle lens optical system, including, in a sequence from an object side, a first lens group having a positive or negative refractive power, a stop, and a second lens group having positive refractive power, wherein the first lens group comprises, in a sequence from the object side, a front group having negative refractive power and a rear group having positive refractive power, and the wide-angle lens optical system satisfies the following Inequalities:

$$1.0 < \frac{f_{II}}{f} < 1.45$$

$$0.6 \leq \left| \frac{f_{Ia}}{f_{Ib}} \right| < 1.5$$

where f denotes the overall focal distance of the lens optical system, $f_{II}$ denotes the focal distance of the second lens group, $f_{Ia}$ denotes the focal distance of the front group of the first lens group, and $f_{Ib}$ denotes the focal distance of the rear group of the first lens group.

7 Claims, 8 Drawing Sheets

LENS OPTICAL SYSTEM

CROSS-REFERENCE TO RELATED PATENT APPLICATION

This application claims the benefit of Korean Patent Application No. 10-2008-0061118, filed on Jun. 26, 2008, in the Korean Intellectual Property Office, the disclosure of which is incorporated herein in its entirety by reference.

BACKGROUND OF THE INVENTION

1. Field of the Invention

The present invention relates to a retro-focusing lens system suitable for wide angle lenses which are used in single-lens reflex cameras, digital cameras, etc., which generally use a 35 mm film or an electronic imaging device.

2. Description of the Related Art

Digital cameras or video cameras that have solid state pickup devices, such as charge coupled devices (CCDs) or complementary metal-oxide semiconductors (CMOSs), are widely in use. In particular, mega-pixel camera modules are in demand, and cameras having at least 5 million pixels and providing high definition are being developed as distribution type digital cameras. Imaging optical apparatuses, such as digital cameras or cellular phone cameras that use imaging devices such as CCDs or CMOSs, are required to be compact, light, and inexpensive.

With an increase in the demand for cameras, the demand for single-focus lenses such as telephoto lenses or wide angle lenses has increased. Retro-focusing (i.e., reversed telephoto) lenses, each having a long back focal distance and including a first lens group having a negative refractive power and a second lens group having a positive refractive power in a sequence from an object side, have been proposed as a wide angle lens. However, conventional retro-focusing lenses perform focusing by using a second lens group, and in this case the height of an extra-axial beam incident upon the lens system of a conventional retro-focusing lens greatly varies and thus aberration more frequently occurs. Therefore, conventional retro-focusing lenses require a method of correcting an aberration variation which occurs during focusing.

SUMMARY OF THE INVENTION

The present invention provides a lens optical system which secures a long back focal distance and provides an improved aberration correction performance.

According to an aspect of the present invention, there is provided a lens optical system including, in a sequence from an object side, a first lens group having positive or negative refractive power; an aperture stop; and a second lens group having positive refractive power, wherein the first lens group comprises, in a sequence from the object side, a front group having negative refractive power and a rear group having positive refractive power, and the lens optical system satisfies the following Inequalities:

$$1.0 < \frac{f_{II}}{f} < 1.45$$

$$0.6 \leq \left|\frac{f_{Ia}}{f_{Ib}}\right| < 1.5$$

where $f$ denotes the overall focal distance of the lens optical system, $f_{II}$ denotes the focal distance of the second lens group, $f_{Ia}$ denotes the focal distance of the front group of the first lens group, and $f_{Ib}$ denotes the focal distance of the rear group of the first lens group.

The front group of the first lens group may include at least one positive lens and satisfies the following Inequalities:

$$1.80 < nIa(p)$$

$$vIa(p) < 35$$

where $nIa(p)$ denotes the average refractive index value of the at least one positive lens of the front group of the first lens group, and $vIa(p)$ denotes the average dispersion value of the at least one positive lens of the front group of the first lens group.

The first and second lens groups may be moved to perform focusing.

According to another aspect of the present invention, there is provided a lens optical system including, in a sequence from an object side, a first lens group having positive or negative refractive power; an aperture stop; and a second lens group having positive refractive power, wherein the first lens group includes, in a sequence from the object side, a front group having negative refractive power and a rear group having positive refractive power; the front group comprises at least one positive lens; the first and second lens groups are moved to become close to each other when focusing is performed in a direction from infinity to a near distance of the optical system; and the lens optical system satisfies the following Inequalities:

$$1.80 < nIa(p)$$

$$vIa(p) < 35$$

where $nIa(p)$ denotes the average refractive index value of the at least one positive lens of the front group of the first lens group, and $vIa(p)$ denotes the average dispersion value of the at least one positive lens of the front group of the first lens group.

The front group of the first lens group may include, in a sequence from the object side, at least one meniscus type negative lens having a convex surface on the object side and a positive lens with both surfaces convex. The rear group of the first lens group may include two strong positive lenses and a negative lens. The second lens group may include a negative lens and three positive lenses.

The second lens group may include a doublet lens including a meniscus negative lens having a concave surface on the object side and a meniscus positive lens having a convex surface on the image side; and two meniscus positive lenses having convex surfaces on the image side. The second lens group may include at least one aspherical lens.

The lens optical system may further include a fixed aperture stop between the front and rear groups of the first lens group.

Each of the first and second lens groups may include at least one doublet lens.

The stop may move together the second lens group.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A lens optical system according to the present invention will now be described more fully with reference to the accompanying drawings, in which exemplary embodiments of the invention are shown.

Figure 1:
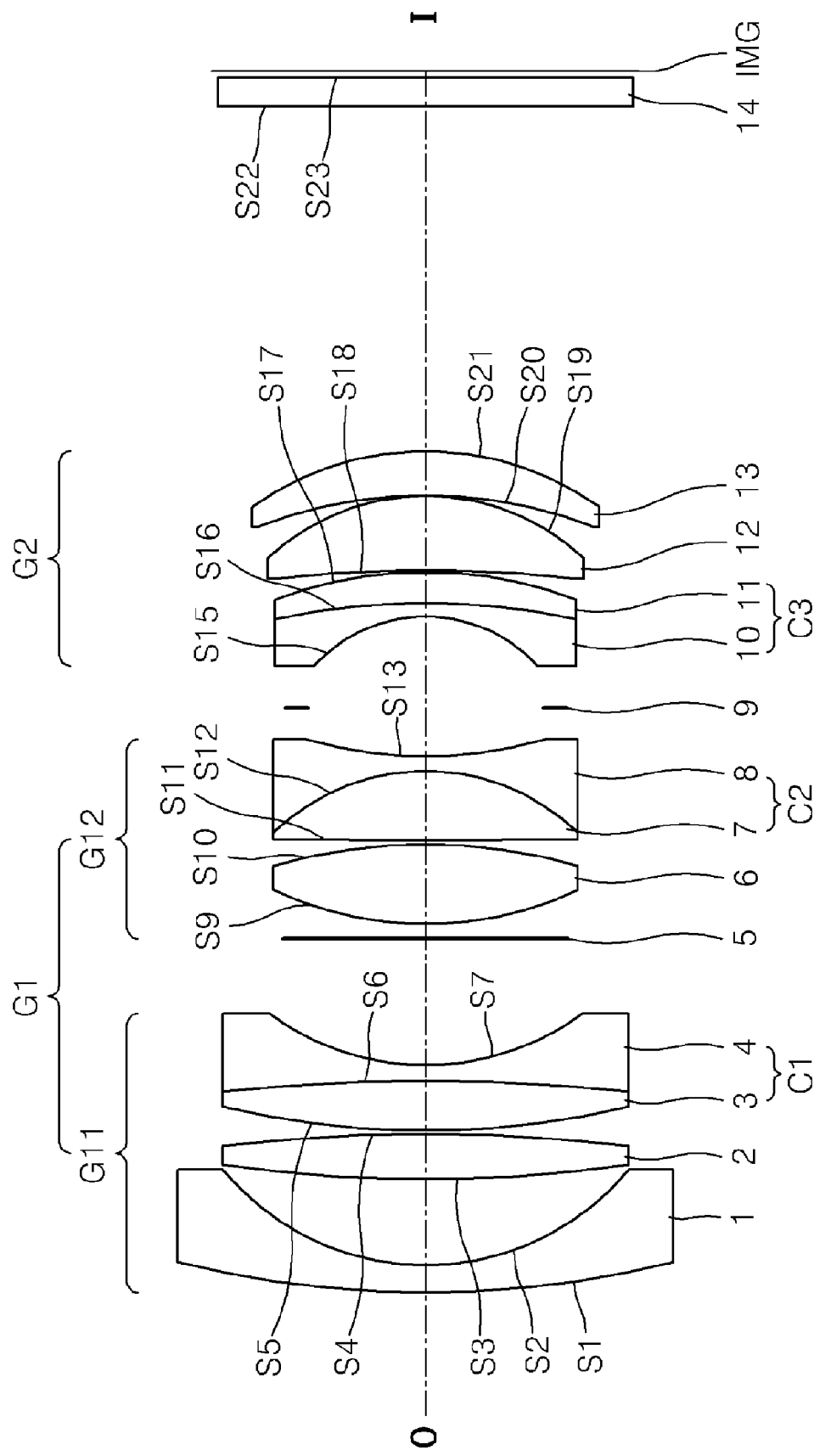
FIG. 1 illustrates a lens optical system according to a first embodiment of the present invention.
Figure 3:
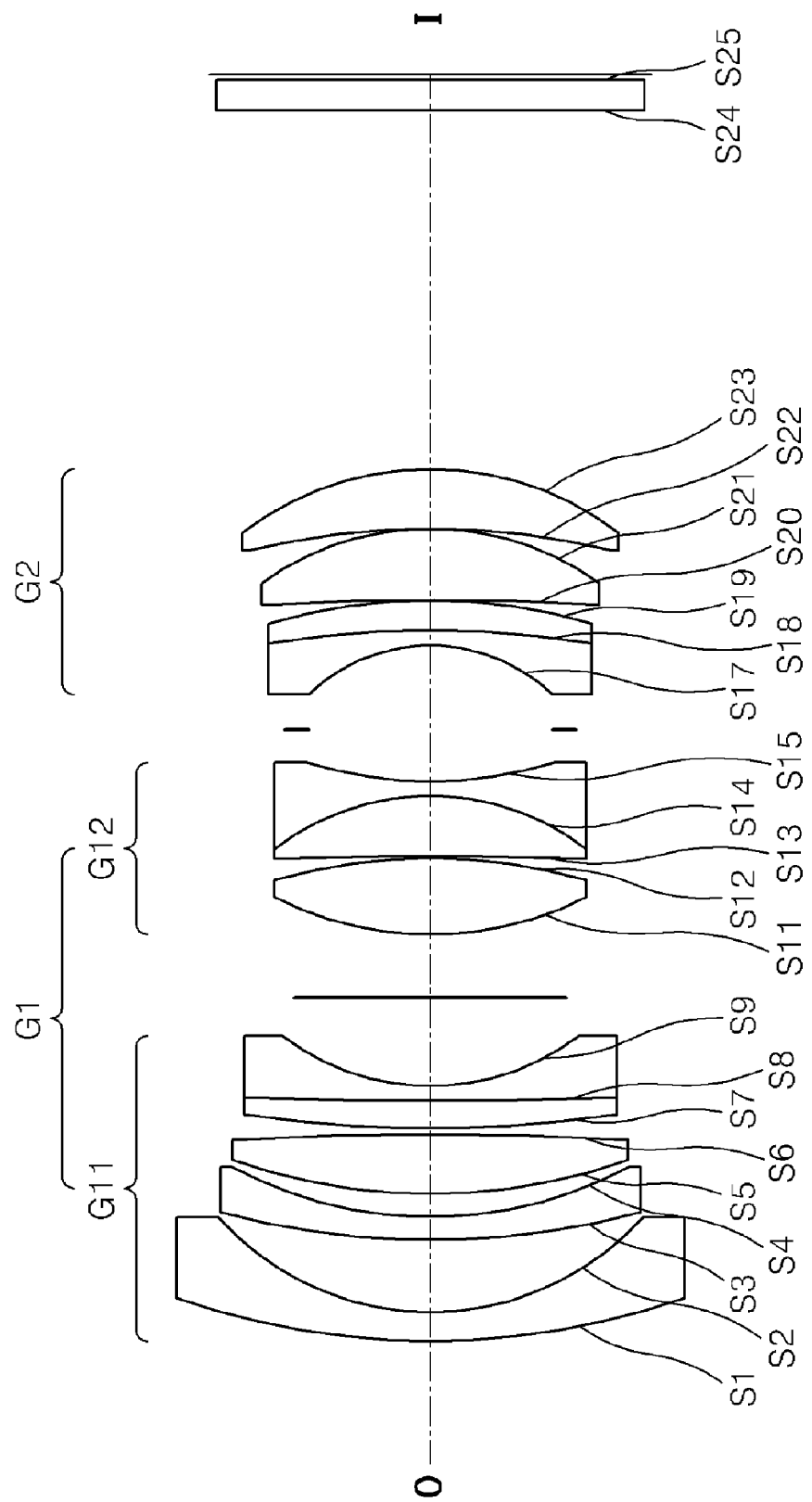
FIG. 3 illustrates a lens optical system according to a second embodiment of the present invention.
Figure 5:
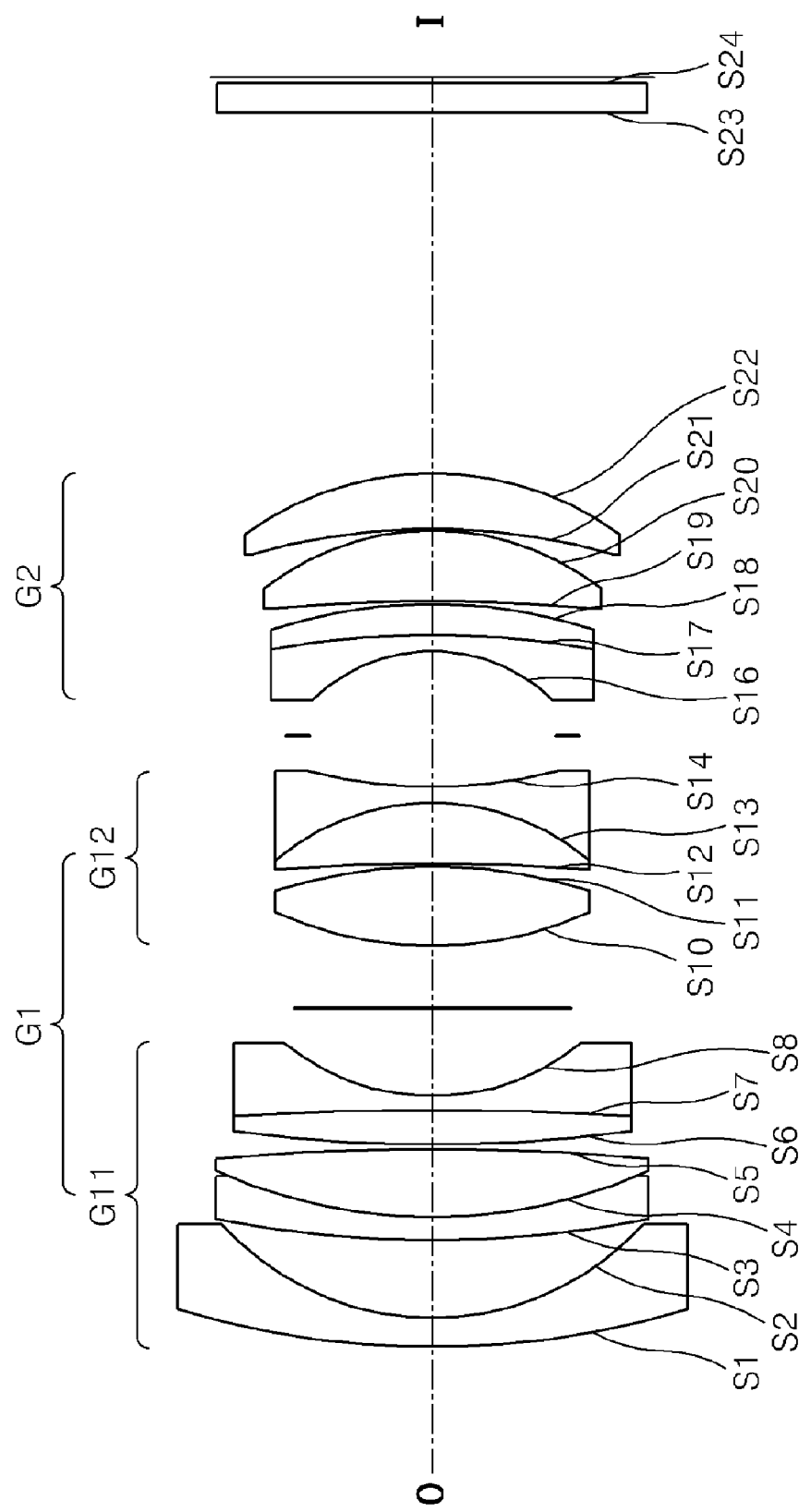
FIG. 5 illustrates a lens optical system according to a third embodiment of the present invention.
Figure 7:
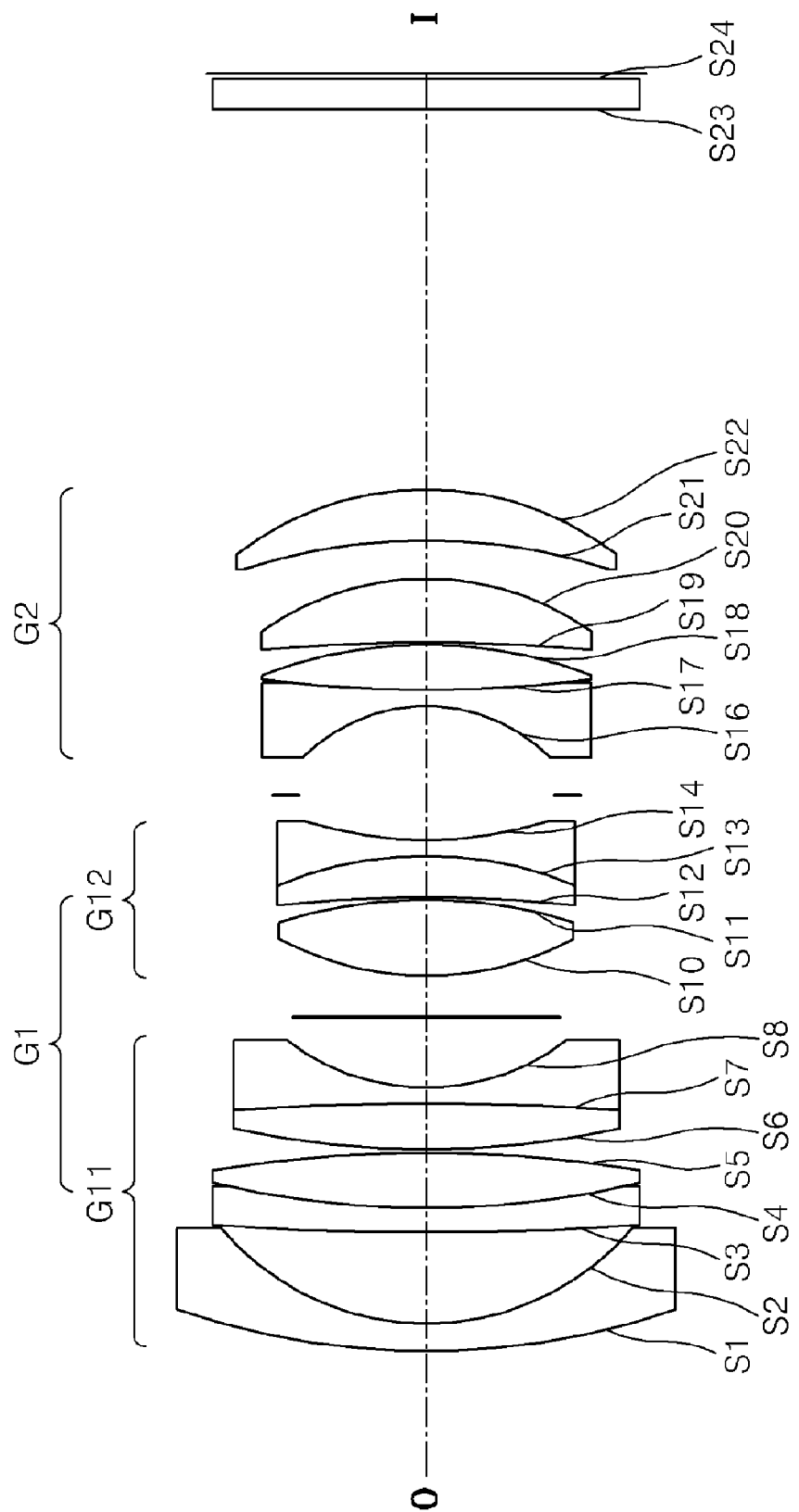
FIG. 7 illustrates a lens optical system according to a fourth embodiment of the present invention.

The present invention relates to a wide angle large-aperture lens used in electronic still cameras, video cameras, single-lens reflex cameras, etc. The wide angle large-aperture lens according to the present invention has a viewing angle of about 75 degrees and an aperture ratio of about 1:1.4, and can perform focusing even with a simple structure. The optical system of the wide angle large-aperture lens according to the present invention includes a first lens group having a positive or negative refractive power and a second lens group having a positive refractive power. FIGS. 1, 3, and 5 illustrate an example of a lens optical system in which the first lens group has a positive refractive power. FIG. 7 illustrates an example of a lens optical system in which the first lens group has a negative refractive power.

FIG. 1 illustrates a lens optical system according to a first embodiment of the present invention. Referring to FIG. 1, the lens optical system according to the current embodiment includes, in a sequence from an object side O to an image side I, a first lens group G1 having positive or negative refractive power, an aperture stop 9, and a second lens group G2 having positive refractive power. The first lens group G1 includes, in a sequence from the object side O, a front group G11 having negative refractive power and a rear group G12 having positive refractive power. A fixed stop 5 may be installed between the front group G11 and the rear group G12 in order to remove flare which is prone to occur in a wide angle lens. The fixed stop 5 has an aperture fixed to cut extra-axial beams.

To secure a sufficient back focal distance, the front group G11 of the first lens group G1 may include, in a sequence from the object side O, at least one meniscus type negative lens having a convex surface on the object side O and a positive lens with both surfaces convex. The front group G11 may further include a first doublet lens C1. Referring to FIG. 1, the front group G11 includes a meniscus type negative lens 1, a biconvex lens 2, and the first doublet lens C1 made up of a first lens 3 and a second lens 4 attached together. Meanwhile, FIGS. 3, 5, and 7 illustrate a front group G11 which includes two meniscus type negative lenses, a biconvex lens, and a doublet lens. By constructing the front group G11 in this way, the front group G11 has an overall negative refractive power. Referring back to FIG. 1, the rear group G12 of the first lens group G2 includes two strong positive lenses 6 and 7 and a negative lens 8 which correct spherical aberration and comma aberration. The strong positive lens 7 and the negative lens 8 may constitute a second doublet lens C2.

The second lens group G2 includes a negative lens and three positive lenses. For example, the second lens group G2 includes a third doublet lens C3, which includes a meniscus negative lens 10 having a concave surface on the object side O and a meniscus positive lens 11 having a convex surface on the image side I, and two meniscus positive lenses 12 and 13 having convex surfaces on the image side I. In the present invention, each of the first lens group G1 and the second lens group G2 includes at least one doublet lens. Reference numeral 14 denotes a filter.

In the present invention, when an object is a short distance away from infinity, the first and second lens groups G1 and G2 are moved to reduce the interval therebetween and then perform focusing. The movements of both the first and second lens groups G1 and G2 to perform focusing may improve the focusing performance. When the second lens group G2 moves, the stop 9 may move together with the second lens group G2.

The lens optical system according to the embodiments of the present invention may be constructed so as to satisfy the following Inequalities 1 and 2:

$$1.0 < \frac{f_{II}}{f} < 1.45 \quad (1)$$

$$0.6 \leq \left|\frac{f_{Ia}}{f_{Ib}}\right| < 1.5 \quad (2)$$

where f denotes the overall focal distance of the lens optical system, $f_{II}$ denotes the focal distance of the second lens group G2, $f_{Ia}$ denotes the focal distance of the front group G11 of the first lens group G1, and $f_{Ib}$ denotes the focal distance of the rear group G12 of the first lens group G1. Inequality 1 represents the ratio of the focal distance $f_{II}$ of the second lens group G2 to the overall focal distance f of the lens optical system. Thus, when the ratio value of Inequality 1 exceeds the upper limit, the lens optical system is no longer a retro-focusing lens system, and thus it is difficult to secure a back focal distance. In addition, the amount of movement of the lenses required for focusing increases, and thus the size of the entire lens optical system is larger. On the other hand, when the ratio value of Inequality 1 is less than from the lower limit, corrections of distortion and spherical aberration are difficult, and the variation of the field curvature according to focusing increases. Inequality 2 represents the ratio of the focal distance $f_{Ia}$ of the front group G11 of the first lens group G1 to the focal distance $f_{Ib}$ of the rear group G12 thereof. When the ratio exceeds the upper limit, securing a back focal distance is difficult, and spherical aberration is prone to go under. On the other hand, when the ratio value of Inequality 2 is less than the lower limit, asymmetry of the entire lens optical system becomes excessive, and thus corrections of distortion and spherical aberration are difficult.

The front group G11 of the first lens group G1 includes at least one positive lens and is constructed so as to satisfy the following Inequalities 3 and 4:

$$1.80 < nIa(p) \quad (3)$$

$$vIa(p) < 35 \quad (4)$$

where nIa(p) denotes the average refractive index value of the positive lens of the front group G11 of the first lens group G1, and vIa(p) denotes the average dispersion value of the positive lens of the front group G11 of the first lens group G1.

Inequalities 3 and 4 represent the refractive index and dispersion value, respectively, of the at least one positive lens included in the front group G11 of the first lens group G1 with respect to of a d-line (wavelength 587.56 nm). When the first lens group G1 deviates from the ranges defined in Inequalities 3 and 4, excessive lateral chromatic aberration occurs. In particular, a change in lateral chromatic aberration according to focusing of the second lens group G12 becomes difficult to correct, and thus it is difficult to obtain good image-formation performance.

The term "aspherical surface" stated in the embodiments of the present invention is defined as follows.

When the direction of the optical axis is set to be an x axis, a direction perpendicular to the optical axis direction is set to be a y axis, and a proceeding direction of a light beam is set to be forward, an aspherical shape of a lens according to the present invention may be expressed as Equation 5:

$$x = \frac{cy^2}{1 + \sqrt{1 - (K+1)c^2 y^2}} + Ay^4 + By^6 + Cy^8 + Dy^{10} \quad (5)$$

where x denotes the distance from an apex of the lens along the x axis, y denotes the distance from the apex of the lens along the y axis, K denotes a conic constant, A, B, C, and D denote aspherical coefficients, and c denotes a reciprocal (1/R) of the radius of curvature of the apex of the lens.

By suitably arranging such aspherical lenses, a zoom lens can be mass-produced while lowering its manufacturing cost.

Detailed data about lenses used in lens optical systems according to several embodiments of the present invention will now be described. Hereinafter, f is referred to as the combined focal distance of the entire lens system, Fno is referred to as the F number, R is referred to as the radius of curvature, D is referred to as a center thickness of a lens or an interval between lenses, Nd is referred to as a refractive index, Vd is referred to as an Abbe number, and ST is referred to as an aperture stop.

First Embodiment

FIG. 1 illustrates a lens optical system according to a first embodiment of the present invention, in which reference numeral 14 denotes a filter. The following is design data about the lens optical system according to the first embodiment.

| f; 28.5 Fno; 1.44 2ω; 75.4° | | | | |
|---|---|---|---|---|
| | R | D | Nd | Vd |
| OBJ: | INFINITY | D0 | | |
| S1: | 106.00000 | 2.800000 | 1.83481 | 42.72 |
| S2: | 28.0400 | 8.770000 | | |
| S3: | 156.00000 | 4.560000 | 1.90366 | 31.32 |
| S4: | −200.00000 | 0.300000 | | |
| S5: | 93.96000 | 5.050000 | 1.84666 | 23.78 |
| S6: | −200.00000 | 1.500000 | 1.49700 | 81.61 |
| S7: | 27.37000 | 13.070000 | | |
| S8: | INFINITY | 1.500000 | | |
| S9: | 42.45800 | 8.140000 | 1.83400 | 37.35 |
| S10: | −56.49000 | 0.200000 | | |
| S11: | 700.00000 | 6.930000 | 1.83481 | 42.72 |
| S12: | 23.74800 | −1.500000 | 1.84666 | 23.78 |
| S13: | 45.97000 | D1 | | |

-continued

| f; 28.5 Fno; 1.44 2ω; 75.4° | | | | |
|---|---|---|---|---|
| | R | D | Nd | Vd |
| ST: | INFINITY | 9.160000 | | |
| S15: | −16.46000 | 1.500000 | 1.80518 | 25.46 |
| S16: | −71.62000 | 3.000000 | 1.80610 | 40.74 |
| S17: | −32.55400 | 0.200000 | | |
| ASP: | | | | |
| K: 0.000000 | | | | |
| A: 0.191408E−04 | B: 0.175479E−07 | | C: 0.227030E−10 | |
| D: −0.147017E−12 | | | | |
| S18: | −175.00000 | 7.440000 | 1.83481 | 42.72 |
| S19: | −25.21000 | 0.200000 | | |
| S20: | −51.22000 | 4.470000 | 1.77250 | 49.62 |
| S21: | −31.88000 | D2 | | |
| S22: | INFINITY | 3.000000 | 1.51680 | 64.20 |
| S23: | INFINITY | 0.500000 | | |
| IMG: | INFINITY | | | |

The following data is the variable distance during focusing.

TABLE 1

| Imaging magnification | 0 | 0.0199 | 0.0881 |
|---|---|---|---|
| D0 | INFINITY | 1400 | 300 |
| D1 | 5.06093 | 4.17179 | 3.50000 |
| D2 | 34.99285 | 35.62332 | 37.59152 |

Figure 2:
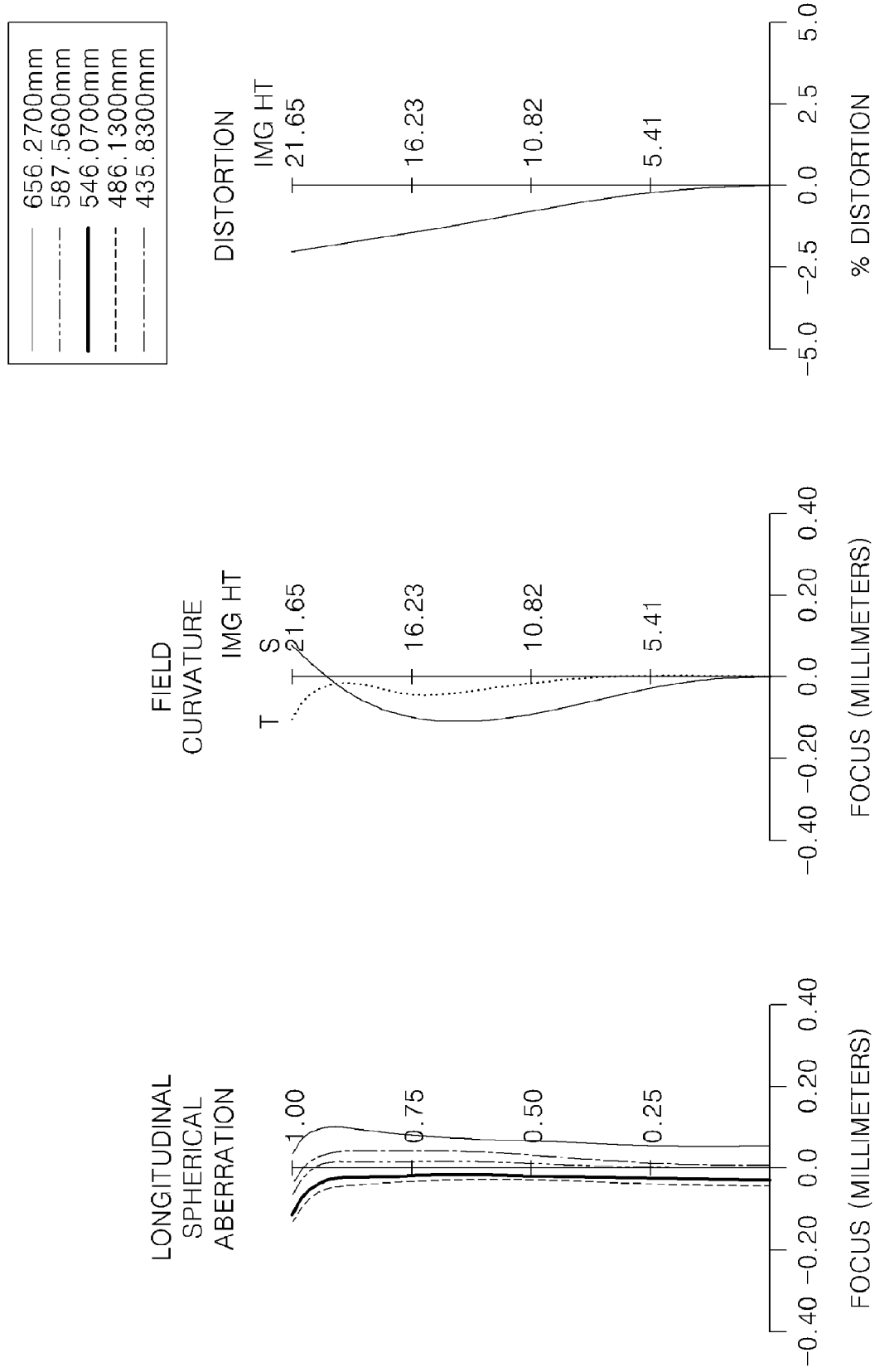
FIG. 2 illustrates the longitudinal spherical aberration, the field curvature, and the distortion of the lens optical system illustrated in FIG. 1.

FIG. 2 illustrates the longitudinal spherical aberration, the field curvature, and the distortion of the lens optical system illustrated in FIG. 1. A tangential field curvature (T) and sagittal field curvature (S) are illustrated as the field curvature.

Second Embodiment

FIG. 3 illustrates a lens optical system according to a second embodiment of the present invention. The following is design data about the lens optical system according to the second embodiment.

| f; 28.4 Fno; 1.44 2ω; 75.5° | | | | |
|---|---|---|---|---|
| | R | D | Nd | Vd |
| OBJ: | INFINITY | D0 | | |
| S1: | 80.80300 | 2.800000 | 1.77250 | 49.62 |
| S2: | 28.86600 | 7.060000 | | |
| S3: | 86.48000 | 2.300000 | 1.48749 | 70.44 |
| S4: | 44.00000 | 2.290000 | | |
| S5: | 63.06000 | 5.950000 | 1.90366 | 31.32 |
| S6: | −258.00000 | 0.300000 | | |
| S7: | 133.00000 | 2.770000 | 1.84666 | 23.78 |
| S8: | 529.00000 | 1.500000 | 1.49700 | 81.61 |
| S9: | 25.42800 | 8.530000 | | |
| S10: | INFINITY | 6.330000 | | |
| S11: | 38.50000 | 7.450000 | 1.83481 | 42.72 |
| S12: | −59.41000 | 0.200000 | | |
| S13: | −572.00000 | 5.750000 | 1.77250 | 49.62 |
| S14: | −27.60000 | 1.500000 | 1.80518 | 25.46 |
| S15: | 46.28000 | D1 | | |
| ST: | INFINITY | 8.250000 | | |
| S17: | −18.38000 | 1.500000 | 1.72825 | 28.32 |

-continued

| f; 28.4 Fno; 1.44 2ω; 75.5° | | | | |
|---|---|---|---|---|
| | R | D | Nd | Vd |
| S18: | −99.24000 | 3.000000 | 1.80610 | 40.74 |
| S19: | −38.58000 | 0.200000 | | |
| ASP: | | | | |
| K: 0.000000 | | | | |
| A: 0.162518E−04 | B: 0.771306E−08 | | C: 0.335377E−10 | |
| D: −0.113631E−12 | | | | |
| S20: | −258.00000 | 6.800000 | 1.77250 | 49.62 |
| S21: | −29.84000 | 0.200000 | | |
| S22: | −71.77000 | 5.620000 | 1.77250 | 49.62 |
| S23: | −31.82400 | D2 | | |
| S24: | INFINITY | 3.000000 | 1.51680 | 64.20 |
| S25: | INFINITY | 0.500000 | | |
| IMG: | INFINITY | | | |

TABLE 2

| Imaging magnification | 0 | 0.0199 | 0.0877 |
|---|---|---|---|
| D0 | INFINITY | 1400 | 300 |
| D1 | 5.00000 | 4.53862 | 3.40831 |
| D2 | 35.06296 | 35.64778 | 37.60149 |

Figure 4:
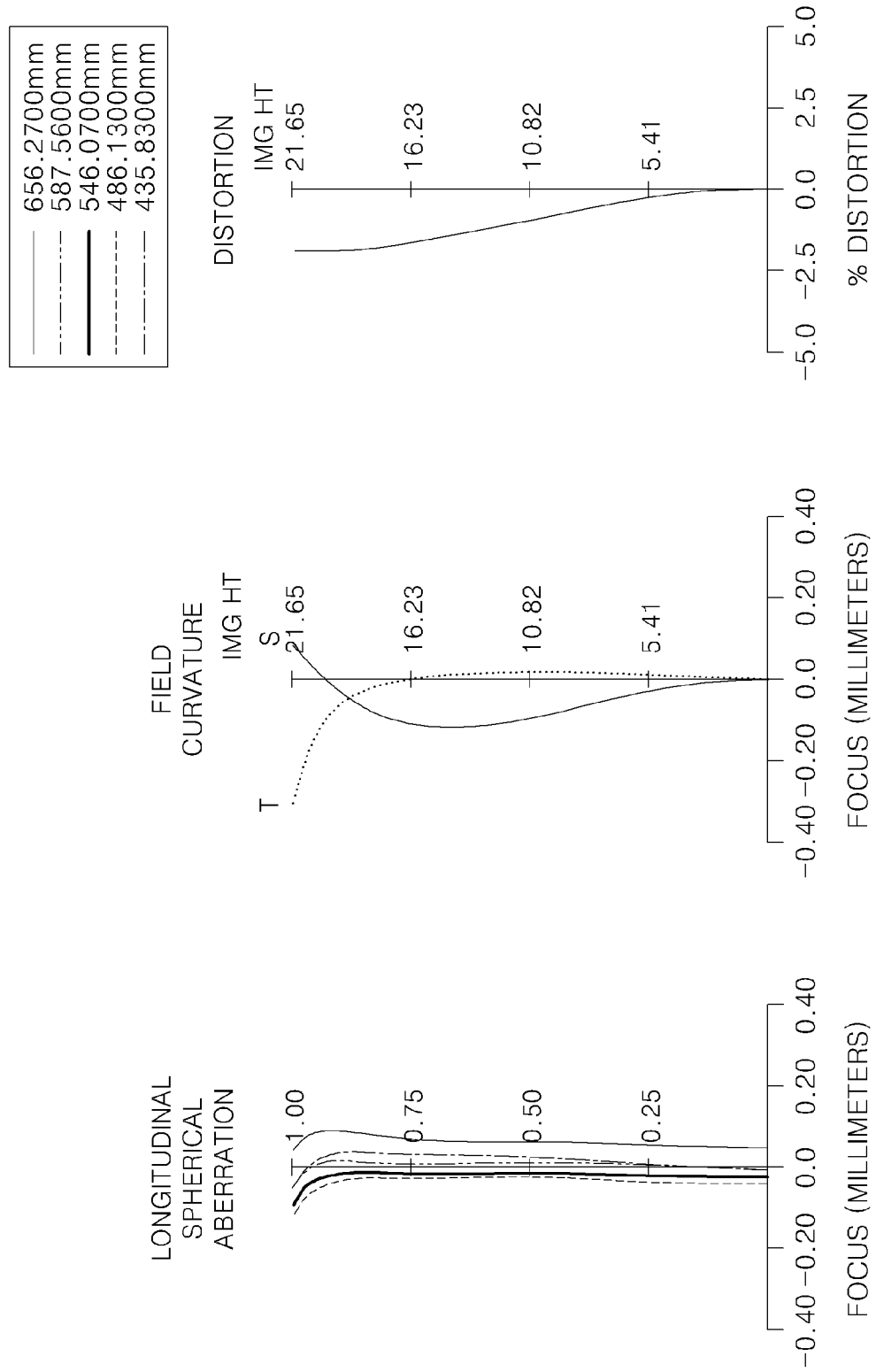
FIG. 4 illustrates the longitudinal spherical aberration, the field curvature, and the distortion of the lens optical system illustrated in FIG. 3.

FIG. 4 illustrates the longitudinal spherical aberration, the field curvature, and the distortion of the lens optical system illustrated in FIG. 3.

Third Embodiment

FIG. 5 illustrates a lens optical system according to a third embodiment of the present invention. The following is design data about the lens optical system according to the third embodiment.

| f; 28.4 Fno; 1.44 2ω; 75.5° | | | | |
|---|---|---|---|---|
| | R | D | Nd | Vd |
| OBJ: | INFINITY | D0 | | |
| S1: | 91.34000 | 2.800000 | 1.83481 | 42.72 |
| S2: | 28.86000 | 7.650000 | | |
| S3: | 111.80000 | 2.300000 | 1.48749 | 70.44 |
| S4: | 54.97000 | 6.660000 | 1.90366 | 31.32 |
| S5: | −267.00000 | 0.300000 | | |
| S6: | 142.00000 | 3.380000 | 1.84666 | 23.78 |
| S7: | −460.00000 | 1.500000 | 1.49700 | 81.61 |
| S8: | 23.72000 | 8.510000 | | |
| S9: | INFINITY | 6.050000 | | |
| S10: | 38.57000 | 7.690000 | 1.80420 | 46.50 |
| S11: | −52.84000 | 0.200000 | | |
| S12: | −267.00000 | 6.150000 | 1.78590 | 43.93 |
| S13: | −24.35000 | 1.500000 | 1.80518 | 25.46 |
| S14: | 49.40000 | D1 | | |
| ST: | INFINITY | 8.250000 | | |
| S16: | −17.80000 | 1.500000 | 1.74077 | 27.76 |
| S17: | −96.60000 | 3.000000 | 1.80610 | 40.74 |
| S18: | −37.75000 | 0.200000 | | |
| ASP: | | | | |
| K: 0.000000 | | | | |
| A: 0.168903E−04 | B: 0.756633E−08 | | C: 0.333780E−10 | |
| D: −0.119476E−12 | | | | |
| S19: | −232.00000 | 7.000000 | 1.80420 | 46.50 |
| S20: | −28.72600 | 0.200000 | | |
| S21: | −70.52000 | 5.480000 | 1.77250 | 49.62 |
| S22: | −32.28000 | D2 | | |

-continued

| f; 28.4 Fno; 1.44 2ω; 75.5° | | | | |
|---|---|---|---|---|
| | R | D | Nd | Vd |
| S23: | INFINITY | 3.000000 | 1.51680 | 64.20 |
| S24: | INFINITY | 0.500000 | | |
| IMG: | INFINITY | | | |

TABLE 3

| Imaging magnification | 0 | 0.0199 | 0.0877 |
|---|---|---|---|
| D0 | INFINITY | 1400 | 300 |
| D1 | 5.00000 | 4.42992 | 3.22931 |
| D2 | 35.01039 | 35.59753 | 37.54887 |

Figure 6:
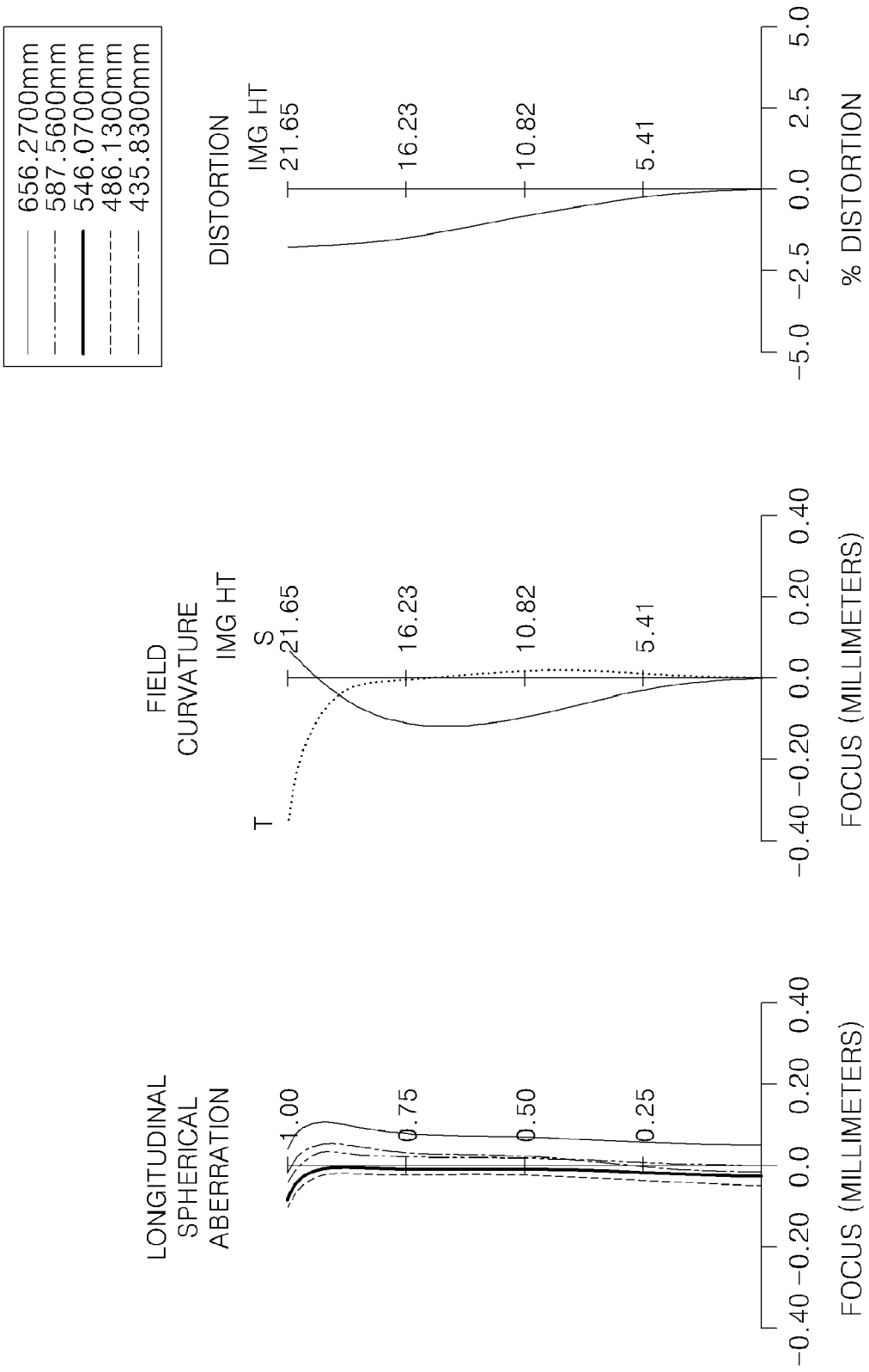
FIG. 6 illustrates the longitudinal spherical aberration, the field curvature, and the distortion of the lens optical system illustrated in FIG. 5.

FIG. 6 illustrates the longitudinal spherical aberration, the field curvature, and the distortion of the lens optical system illustrated in FIG. 5.

Fourth Embodiment

FIG. 7 illustrates a lens optical system according to a fourth embodiment of the present invention. The following is design data about the lens optical system according to the fourth embodiment.

| f; 28.5 Fno; 1.44 2ω; 75.4° | | | | |
|---|---|---|---|---|
| | R | D | Nd | Vd |
| OBJ: | INFINITY | D0 | | |
| S1: | 81.20000 | 2.800000 | 1.80420 | 46.50 |
| S2: | 28.00000 | 8.900000 | | |
| S3: | 329.00000 | 2.300000 | 1.69680 | 55.46 |
| S4: | 93.30000 | 5.630000 | 1.90366 | 31.32 |
| S5: | −135.00000 | 0.300000 | | |
| S6: | 92.50000 | 4.560000 | 1.84666 | 23.78 |
| S7: | −250.00000 | 1.500000 | 1.49700 | 81.61 |
| S8 | 23.52000 | 6.990000 | | |
| S9: | INFINITY | 4.000000 | | |
| S10: | 33.23000 | 7.490000 | 1.73400 | 51.05 |
| S11: | −50.52000 | 0.200000 | | |
| S12: | −140.00000 | 4.190000 | 1.80420 | 46.50 |
| S13: | −39.62000 | 1.500000 | 1.84666 | 23.78 |
| S14: | 44.41000 | D1 | | |
| ST: | INFINITY | 8.770000 | | |
| S16: | −18.51000 | 1.500000 | 1.67270 | 32.17 |
| S17: | 137.00000 | 4.510000 | 1.77250 | 49.62 |
| S18: | −33.59500 | 0.200000 | | |
| ASP: | | | | |
| K: 0.000000 | | | | |
| A: 0.135046E−04 | B: 0.168992E−07 | | C: 0.299163E−11 | |
| D: −0.223557E−13 | | | | |
| S19: | −208.00000 | 6.280000 | 1.77250 | 49.62 |
| S20: | −29.89000 | 3.810000 | | |
| S21: | −64.66000 | 5.060000 | 1.71300 | 53.94 |
| S22: | −32.54000 | D2 | | |
| S23: | INFINITY | 3.000000 | 1.51680 | 64.20 |
| S24: | INFINITY | 0.500001 | | |
| IMG: | INFINITY | | | |

TABLE 4

| Imaging magnification | 0 | 0.0201 | 0.0891 |
|---|---|---|---|
| D0 | INFINITY | 1400 | 300 |
| D1 | 5.08548 | 4.48744 | 3.17823 |
| D2 | 36.92642 | 37.49936 | 39.47036 |

Figure 8:
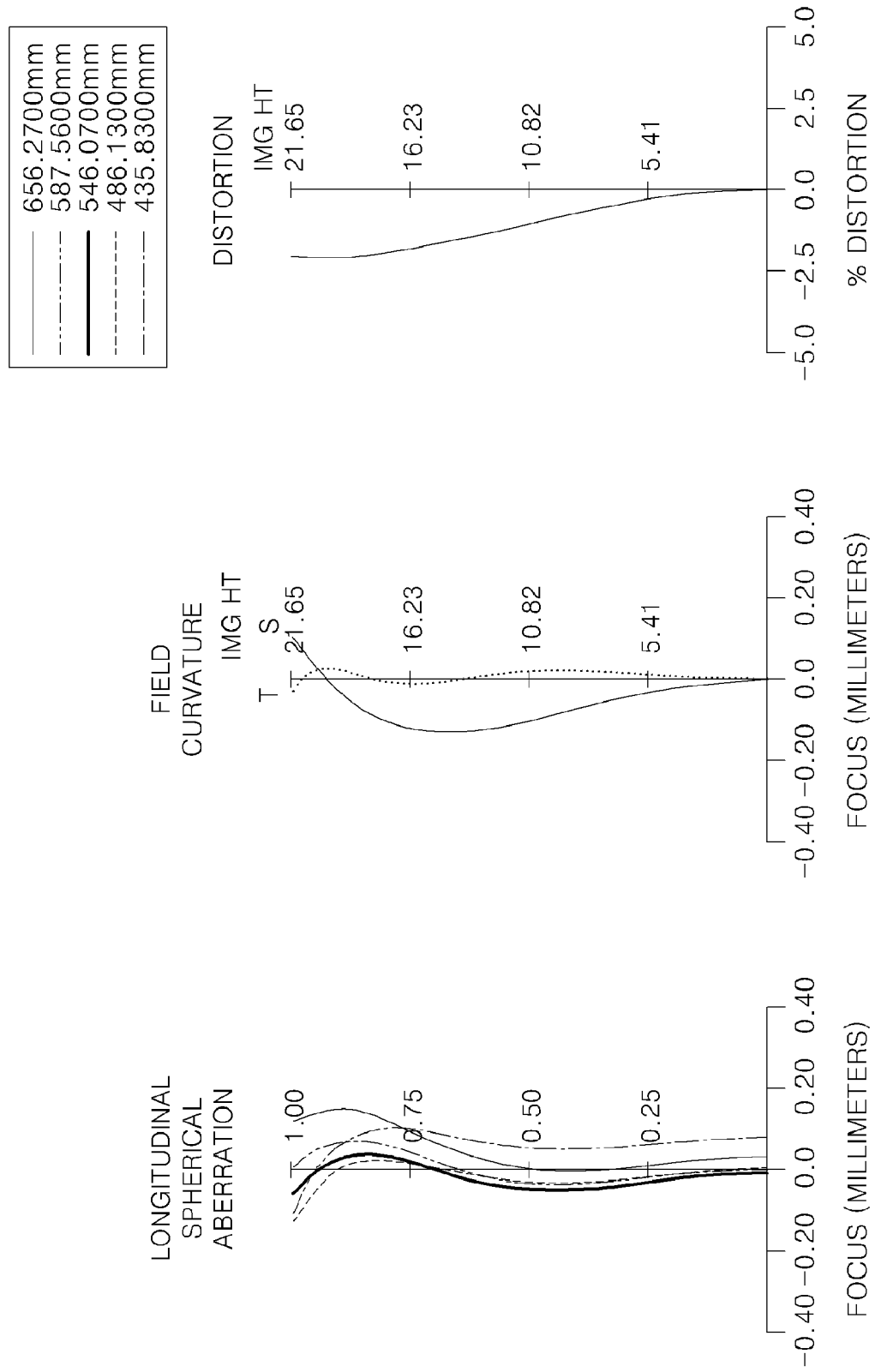
FIG. 8 illustrates the longitudinal spherical aberration, the field curvature, and the distortion of the lens optical system illustrated in FIG. 7.

FIG. 8 illustrates the longitudinal spherical aberration, the field curvature, and the distortion of the lens optical system illustrated in FIG. 7.

Table 5 shows that the first through fourth embodiments satisfy Inequalities 1 through 4.

TABLE 5

| | Inequality 1 | Inequality 2 | Inequality 3 | Inequality 4 |
|---|---|---|---|---|
| First embodiment | 1.36 | 1.11 | 1.88 | 27.55 |
| Second embodiment | 1.35 | 1.04 | 1.88 | 27.55 |
| Third embodiment | 1.32 | 1.04 | 1.88 | 27.55 |
| Fourth embodiment | 1.24 | 0.79 | 1.88 | 27.55 |

As described above, a lens optical system according to the present invention has a viewing angle of about 75 degrees, is suitable for a wide angle large-aperture lens having an aperture ratio of about 1:1.4, and can perform focusing even with a simple structure. Moreover, the lens optical system secures a sufficiently long back focal distance and thus can be used as a retro-focusing lens.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens optical system comprising, in a sequence from an object side:
   a first lens group;
   an aperture stop; and
   a second lens group having positive refractive power,
   wherein the first lens group comprises, in a sequence from the object side, a front group having negative refractive power and a rear group having positive refractive power, and the lens optical system satisfies the following Inequalities:

$$1.0 < \frac{f_{II}}{f} < 1.45$$

$$0.6 \leq \left|\frac{f_{Ia}}{f_{Ib}}\right| < 1.5$$

where f denotes the overall focal distance of the lens optical system, $f_{II}$ denotes the focal distance of the second lens group, $f_{Ia}$ denotes the focal distance of the front group of the first lens group, and $f_{Ib}$ denotes the focal distance of the rear group of the first lens group.

2. The lens optical system of claim 1, wherein the front group of the first lens group comprises at least one positive lens and the lens optical system satisfies the following Inequalities:

$$1.80 < nIa(p)$$

$$vIa(p) < 35$$

where nIa(p) denotes the average refractive index value of the at least one positive lens of the front group of the first lens group, and vIa(p) denotes the average dispersion value of the at least one positive lens of the front group of the first lens group.

3. The lens optical system of claim 1, wherein the first and second lens groups are moved to perform focusing.

4. The lens optical system of claim 1, wherein the front group of the first lens group comprises, in a sequence from the object side, at least one meniscus type negative lens having a convex surface on the object side and a positive lens with both surfaces convex.

5. The lens optical system of claim 1, wherein the rear group of the first lens group comprises two strong positive lenses and a negative lens.

6. The lens optical system of claim 1, wherein the second lens group comprises a negative lens and three positive lenses.

7. The lens optical system of claim 1, wherein the second lens group comprises:
   a doublet lens comprising a meniscus negative lens having a concave surface on the object side and a meniscus positive lens having a convex surface on the image side; and
   two meniscus positive lenses having convex surfaces on the image side.

* * * * *